United States Patent [19]

Fernando

[11] Patent Number: 4,974,084
[45] Date of Patent: Nov. 27, 1990

[54] METHOD AND APPARATUS FOR PICTURE MOTION MEASUREMENT

[75] Inventor: Gerard M. X. Fernando, Croydon, England

[73] Assignee: U.S. Philips Corporation, New York, N.Y.

[21] Appl. No.: 397,055

[22] Filed: Aug. 22, 1989

[30] Foreign Application Priority Data

Sep. 5, 1988 [GB] United Kingdom ................ 8820839

[51] Int. Cl.$^5$ ............................................ H04N 7/18
[52] U.S. Cl. ................................................. 358/105
[58] Field of Search ............... 358/105, 125, 140, 135, 358/136

[56] References Cited

U.S. PATENT DOCUMENTS 4,220,967 9/1980 Ichida et al. ......................... 358/105

FOREIGN PATENT DOCUMENTS 2188510 9/1987 United Kingdom .
2205706 12/1988 United Kingdom .
2205712 12/1988 United Kingdom .

Primary Examiner—James J. Groody
Assistant Examiner—Victor R. Kostak
Attorney, Agent, or Firm—Michael E. Marion

[57] ABSTRACT

Television pictures are divided up into a number of regions and corresponding regions for two pictures are correlated to produce motion vectors at an output connectrion (2) of a motion vector generator (1) which also at an output connection (4) produces signals signifying relative magnitude and/or width of the vectors which control the weighting operation of a weighting circuit (3). The weighted vectors are applied to a two-dimensional summing arangement (5) where corresponding vectors from the various regions are summed in individual stores. A largest vector selector (6) selects the most dominant of the motion vectors depending upon the quantities stored in the summing selector (6).

17 Claims, 1 Drawing Sheet

METHOD AND APPARATUS FOR PICTURE MOTION MEASUREMENT

Background of the Invention

The present invention relates to a method of picture motion measurement comprising subdividing pictures into two or more regions and correlating corresponding regions of two pictures as a function of displacement thereby to determine from peak correlation values a plurality of motion vectors. The invention also relates to apparatus for use with such a method.

A method of the above type is described in U.K. Patent Application No. GB 2188510A which is particularly concerned with the generation of motion vectors for television pictures. In the field of High Definition Television (HDTV) such motion vectors are conveyed with a television signal and are used to produce at a receiver an enhanced display either by assisting in producing additional lines to those in the received signal or in producing additional fields between those in the received signal. Because of limited capacity it is not always possible to transmit every motion vector generated and thus a selection needs to be made from the generated motion vectors.

It is an object of the present invention to provide a method of the above type and apparatus in which the most dominant motion vectors can be readily selected.

Summary of the Invention

The invention according to a first aspect provides a method of picture motion measurement comprising sub-dividing pictures into two or more regions and correlating corresponding regions of two pictures to determine correlation as a function of displacement thereby to determine from peak correlation values a plurality of motion vectors, said method being characterized by the further steps of:

(i) weighting motion vectors from regions of said sub-divided picture in dependence upon a given relative quantity of peaks in said correlation function, (ii) individually summing those weighted motion vectors having corresponding coordinates from said regions of said sub-divided picture to produce a plurality of summed quantities each quantity relating to particular motion vector coordinates, and (iii) selecting the coordinates of a given number of the largest of said summed quantities to form the most dominant of said motion vectors.

Such a method has the advantage that the most dominant motion vectors may be established in a reliable manner.

The invention may be further characterized in that the weighting of the motion vectors depends upon the relative magnitudes of the peaks in the correlation functions. Thus the greater the magnitude of a peak the greater the number of pixels in a region which have the same degree of movement and if such a degree of movement dominates in other regions then its importance is emphasized by weighting. As an alternative or in addition the weighting could be dependent on the relative widths of the peaks which is related to blurring produced at picture source by possible integration.

The given number of dominant motion vectors may be directly proportional to the interval between the two pictures. Thus if the two pictures are spaced two television frames apart the number of motion vectors will be twice that if the pictures are only spaced by one television frame.

If at least said given number of the summed quantities are of a correspondingly large magnitude a complexity signal may be produced in addition to or instead of selecting coordinates to form the most dominant motion vectors, the complexity signal indicating that the pictures contain a large degree of motion complexity.

The invention also provides apparatus for use with the above method. Apparatus for picture motion measurement according to a second aspect of the invention may comprise means for correlating corresponding regions of two pictures to determine correlation as a function of displacement to determine from peak correlation values a plurality of motion vectors, and may be characterized by additionally comprising means for weighting motion vectors from regions of said sub-divided picture in dependence upon a given relative quantity of peaks in said correlation functions, means for individually summing those weighted vector motion vectors having corresponding coordinates from said regions of said sub-divided picture to produce a plurality of summed quantities each quantity relating to particular motion vector coordinates and means for selecting the coordinates of a given number of the largest of said summed quantities to form the most dominant of said motion vectors.

The means for weighting the motion vectors may comprise means for weighting the motion vectors depending upon the relative magnitudes and/or the relative widths of the peaks in the correlation functions.

In the case where the given number of summed quantities are of a corresponding large magnitude means may be provided for producing a complexity signal which signal may be produced in addition to or instead of the most dominant motion vectors.

BRIEF DESCRIPTION OF THE DRAWING

The above and other features will now be described, by way of example, with reference to the accompanying drawings, in which.

DETAILED DESCRIPTION OF THE INVENTION

Figure 1:
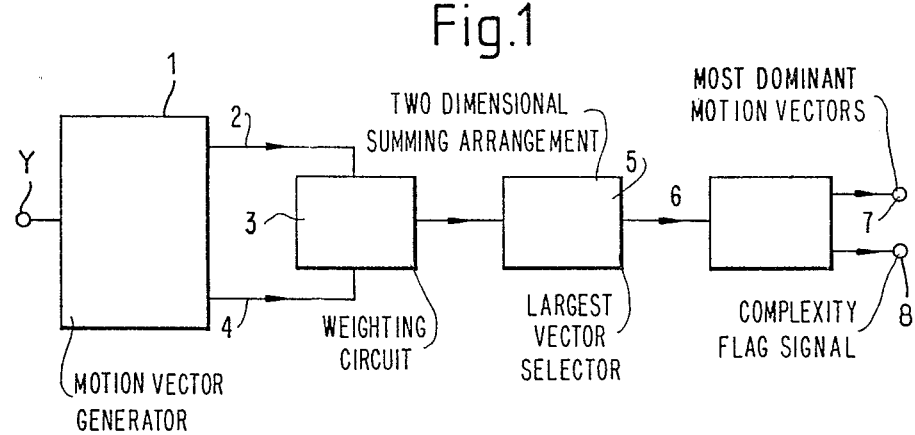
FIG. 1 is a block diagram of apparatus for use with the invention.
Figure 2:
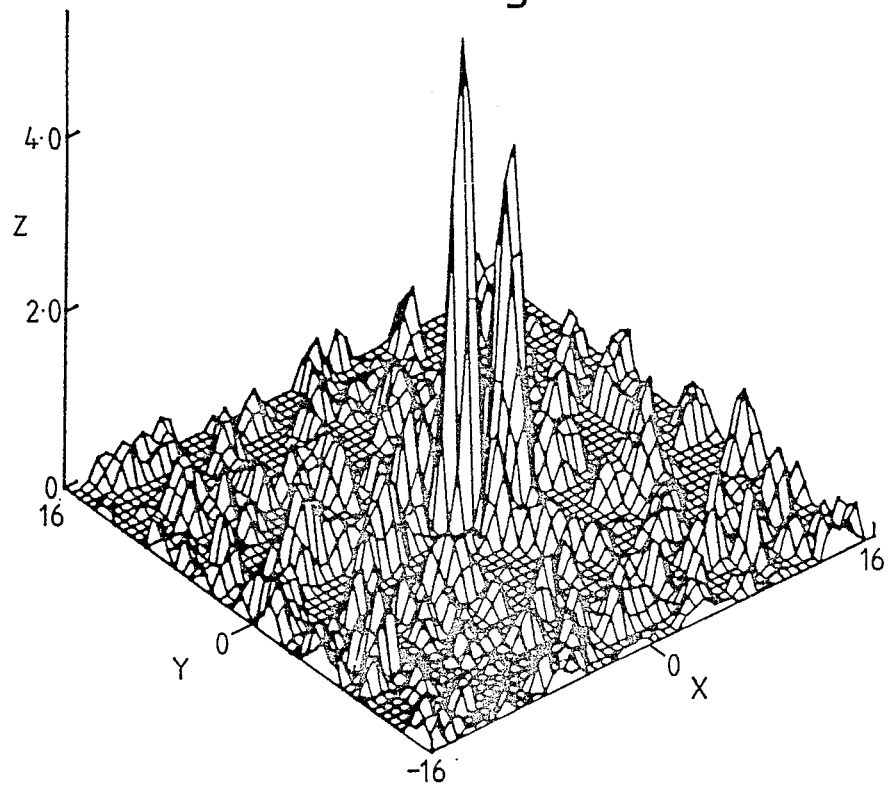
FIG. 2 is a typical correlation surface for the same region of two pictures of a television signal.

In the block diagram of FIG. 1 the reference 1 denotes a motion vector generator having a luminance input Y in which the television pictures for a television system are sub-divided to form a number of regions and it will be assumed for present purposes that each region is 32 pixels by 32 lines though of course that other sized regions are possible. The luminance information for corresponding regions in two adjacent television pictures are correlated to produce a correlation function for each pair of corresponding regions, a typical correlation surface for such a function being shown in FIG. 2 where the displacement in the X and Y directions run from −16 to +16 sample positions where each sample is one pixel apart. In practice FIG. 2 would not appear as a continuous correlation function but as a series of discrete samples of given magnitudes spaced one pixel apart or closer if the function is determined to sub-pixel accuracy. The correlation surface may be achieved by means of phase correlation as described in the above UK Patent Application or in the article "Video-rate Image Correlation Processor" by J. J. Pearson, D. C. Hines Jr., S. Golosman and C. D. Kinglin, SPIE Vol. 119, Applications of Digital Image Processing (IOCC 1977) or by any other suitable method such as optimal matching of corresponding regions. Zero displacement represents lack of movement and the peaks located away from the zero displacement coordinates indicate varying degrees of movement of components within the region.

The peaks in the correlation surface indicate the coordinates for motion vectors for the region in question and further processing may be used to increase the accuracy of peak location in order to increase the accuracy of the coordinates. This may be achieved as described in our copending application Ser. No. 388,421 filed in Aug. 2, 1989 or in our copending application Ser. No. 388,422 filed in Aug. 2, 1989 PHB33485. The motion vector coordinates for each region of a picture, or at least the most dominant (say 10) for each region are applied over a connection 2 to a weighting circuit 3 which also receives from the motion vector generator 1 over a connection 4 a signal for each motion vector representing the relative magnitude and/or the relative width of the peak it is derived from. The magnitude of a peak is related to the number of pixels in a region that have the same degree of movement while the width of a peak is related to blurring produced at picture source by possible integration. By means of the weighting circuit 3 each motion vector from each region can be weighted according to the input from connection 4.

The resulting weighted motion vectors are applied to a two-dimentional summing arrangement 5 which comprises 32 by 32 individual stores or "bins" each one of which corresponds to a particular one of the 32 by 32 motion vectors. Each store therefore receives and stores a number of weighted quantities for a corresponding motion vector depending on the number of regions in which that vector appears and its relative magnitude and/or width, these quantities being summed in their respective stores. Summing arrangement 5 can be thought of as providing a two-dimensional vector histogram. The resulting summed quantities are applied to a largest vector selector 6 which selects a given number (say 16) of motion vectors whose stores in the summing arrangement 5 contain the largest quantities. This given number forms the most dominant motion vectors for the adjacent television frames under consideration which motion vectors are applied to a terminal 7 for coding prior to transmission with the television signal. Should the picture under investigation have a large degree of motion complexity such as in the case of picture zooming where no one vector dominates, normal motion vector techniques at the receiver which use a limited number of motion vectors will not portray the true position in the picture. In such a case many of the stores in the summing arrangement 5 will contain summed quantities of corresponding magnitude. If the selector 6 confirms such a situation (say more than 16 motion vectors of similar large magnitude) it will produce a complexity flag signal at an output 8. When this happens receivers will use simpler methods of interpolation which do not depend on motion vectors.

In the above description the two pictures are adjacent and thus one picture or frame period apart to produce the given number e.g. 16 dominant motion vectors. There is no reason why the period over which the dominant motion vectors are derived should not be an integral number of picture periods greater than one in which case the given number of dominant motion vectors would be multiplied by that integral number. Thus the number of dominant motion vectors relevant to a two picture period could be 32. Although the greater number of dominant motion vectors could be selected by operating on motion vectors produced over (say) a two picture or frame period it would be simpler if a two-dimensional summing operation were produced for the first frame period in the manner as described and then adding these to the motion vector produced by the regions for the second frame period. In other words a two-dimensional histogram is produced for the first frame period which is "topped up" during the second frame period. The most dominant motion vectors are then taken from the resulting summing operation.

Although in the above the method is described as being carried out by apparatus units which have specified functions it will be realised that the method may be performed by a microcomputer under dedicated software control.

From reading the present disclosure, other modifications will be apparent to persons skilled in the art. Such modifications may involve other features which are already known in the design, manufacture and use of the method and apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim

1. A method of picture motion measurement comprising subdividing pictures into two or more regions and correlating corresponding regions of two pictures to determine correlation as a function of displacement thereby to determine from peak correlation values for each region a plurality of motion vectors, said method comprising the further steps of:
    (i) weighting motion vectors from regions of said sub-divided picture in dependence upon a given relative quantity of peaks in said correlation functions,
    (ii) individually summing those weighted motion vectors having corresponding coordinates from said regions of said sub-divided picture to produce a plurality of summed quantities each quantity relating to particular motion vector coordinates, and
    (iii) selecting the coordinates of a given number of the largest of said summed quantities to from the most dominant of said motion vectors.

2. A method as claimed in claim 1, wherein: said given relative quantity corresponds to the relative magnitudes of peaks and in the correlation functions.

3. A method as claimed in claim 1 wherein said given relative quantity corresponds to the relative widths of peaks in the correlation functions.

4. A method as claimed in claim 1, wherein in said given number of dominant motion vectors is directly proportional to the interval between said two pictures.

5. A method as claimed in claim 1, for use in a television system, wherein said given number of dominant motion vectors is directly proportional to the number of frames between said two pictures.

6. A method as claimed in claim 1 wherein in the case that at least said given number of said summed quantities are of a correspondingly large magnitude a complexity signal is produced in addition to or instead of selecting coordinates to form the most dominant motion vectors, said complexity signal indicating that said pictures contain a large degree of motion complexity.

7. A method as claimed in claim 5, wherein in the case that at least said given number of said summed quantities are of a correspondingly large magnitude a complexity signal is produced in addition to or instead of selecting coordinates to form the most dominant motion vectors, said complexity signal indicating that said pictures contain a large degree of motion complexity.

8. A method as claimed in claim 2, wherein said given number of dominant motion vectors is directly proportional to the interval between said two pictures.

9. A method as claimed in claim 3, wherein said given number of dominant motion vectors is directly proportional to the interval between said two pictures.

10. A method as claimed in claim 2, for use in a television system, wherein said given number of dominant motion vectors is directly proportional to the number of frames between said two pictures.

11. A method as claimed in claim 3, for use in a television system, wherein said given number of dominant motion vectors is directly proportional to the number of frames between said two pictures.

12. Apparatus for picture motion measurement comprising means for correlating corresponding regions of two pictures to determine correlation as a function of displacement to determine from peak correlation values for each region a plurality of motion vectors, characterized in that said apparatus additionally comprises means for weighting motion vectors from regions of said sub-divided picture in dependence upon given relative quantity of peaks in said correlation functions, means for individually summing those weighted motion vectors having corresponding coordinates from said regions of said sub-divided picture to produce a plurality of summed quantities each quantity relating to particular motion vector coordinates and means for selecting the coordinates of a given number of the largest of said summed quantities to form the most dominant of said motion vectors.

13. Apparatus as claimed in claim 12, wherein said means for weighting said motion vectors comprises means for weighting said motion vectors depending upon the relative magnitudes of peaks in the correlation functions.

14. Apparatus as claimed in claim 12, wherein said means for weighting said motion vectors comprises means for weighting said motion vectors depending upon the relative widths of the peaks in the correlation functions.

15. Apparatus as claimed in claim 12, wherein in the case where said given number of said summed quantities are of a correspondingly large magnitude means are provided for producing a complexity signal which signal may be produced in addition to or instead of the most dominant motion vectors.

16. Apparatus as claimed in claim 13, wherein in the case where said given number of said summed quantities are of a correspondingly large magnitude means are provided for producing a complexity signal which signal may be produced in addition to or instead of the most dominant motion vectors.

17. Apparatus as claimed in claim 14, wherein in the case where said given number of said summed quantities are of a correspondingly large magnitude means are provided for producing a complexity signal which signal may be produced in addition to or instead of the most dominant motion vectors.

* * * * *